United States Patent [19]

Boston et al.

[11] Patent Number: 4,588,153
[45] Date of Patent: May 13, 1986

[54] WIRE HOLDER

[76] Inventors: Edward P. Boston, 109 N. Evans Lawn, Aurora, Ill. 60506; Robert L. Gibson, 1818 W. Greenleaf Ave., Chicago, Ill. 60626

[21] Appl. No.: 663,082

[22] Filed: Oct. 18, 1984

[51] Int. Cl.⁴ .............................................. F16L 3/08
[52] U.S. Cl. .................................. 248/74.2; 248/206.2
[58] Field of Search ................ 248/74.1, 49, 62, 74.2, 248/113, 205.5, 206.2, 206.3, 206.4; 362/397, 391, 806; 174/175, 168, 174

[56] References Cited

U.S. PATENT DOCUMENTS

| | | | |
|---|---|---|---|
| 1,669,838 | 5/1928 | Peterson | 248/206.3 |
| 2,052,425 | 8/1936 | Simeone | 362/397 X |
| 2,704,302 | 3/1955 | Budd | 174/175 |
| 3,304,038 | 2/1967 | Guthrie | 248/71 |
| 3,541,322 | 11/1970 | Bennett | 248/206 A X |

FOREIGN PATENT DOCUMENTS 534090 3/1922 France .................................. 174/175
179378 5/1922 United Kingdom ................ 174/175

Primary Examiner—J. Franklin Foss
Attorney, Agent, or Firm—Wood, Dalton, Phillips, Mason & Rowe

[57] ABSTRACT

A wire holder having an attaching base of molded flexible material to define a suction cup for secure mounting to a surface and a wire mount formed integrally with the attaching base and having a pair of perpendicular slits for each releasably retaining a length of wire. The slits extend to different depths whereby two wire lengths mounted in the slits do not interfere with each other. The slits are of a width less than the wire and each have a generally circular recess at the base thereof whereby a wire is inserted by slight deformation of the wire mount and, thereafter, with the wire length in the generally circular recess the wire is retained in position by the closed slit. The wire holder facilitates mounting of wires, such as Christmas light wiring, to nonporous, slippery surfaces, such as a window, whereby the desired ornamental appearance may be achieved.

1 Claim, 6 Drawing Figures

WIRE HOLDER

BACKGROUND OF THE INVENTION

This invention pertains to the nonpermanent mounting of wires, such as Christmas lighting, to a nonporous slippery surface, such as a window, to achieve a desired lighting effect.

More particularly, the mounting is achieved by the use of a wire holder formed of a flexible resilient material and having a first part defining a suction cup for releasable attachment to a surface and a second part integral therewith defining a wire mount provided with one or more open-ended slits into which a length of wire can be inserted and releasably held in position.

Mounting of Christmas lighting to a window by tape is not effective since moisture causes the tape to loosen. Also, adhesive remains on the window after removal of the tape.

Although it is known to use suction cups for attachment to a nonslippery porous surface, such as a window, and to support some object by the suction cup so attached, it has not been known to provide a wire holder that can be attached to such a surface to provide a simple, convenient way for decorating windows with Christmas lights by wire-holding structure which will permit easy insertion and removal of a wire and which has the capability for repeated use.

SUMMARY OF THE INVENTION

A primary feature of the invention is to provide a new and improved wire holder to facilitate decorating windows with Christmas lights.

Another feature of the invention is to provide a new and improved wire holder whereby a plurality of the wire holders can be mounted at desired positions on a nonporous slippery surface, such as a window, and with each wire holder constructed for holding one or more lengths of wire to enable the arrangement of decorative lighting, such as Christmas lighting, on the window. The wire holders have a first part defining a suction cup to assure firm attachment to the window and an integral second part provided with flexible legs having slits therebetween which terminate in generally circular recesses for releasably holding the wires in association with the wire holder.

With the wire holder of this invention, a plurality of the wire holders can be mounted on a window for each holding at least one length of Christmas light wire and in positions to enable the arrangement of the lights for the desired display.

The wire holder will remain in position on the window glass until forcibly released and can be stored for reuse at a later time.

An object of the invention is to provide a new and improved wire holder for holding Christmas lights in a desired decorative arrangement on a window.

Still another object of the invention is to provide a wire holder of flexible material having a first part defining a suction cup for mounting to a nonporous surface and an integral second part extending from the first part and having a slit defining a pair of flexible legs and which receives and grips a wire positioned in said slit.

Still another object of the invention is to provide a wire holder for supporting one or more wires on a nonporous slippery surface comprising, an attaching base of molded flexible material having a suction cup shape for holding to said surface by negative pressure and a wire mount of the same material and integral with said attaching base, said wire mount being generally cylindrical and having a slit opening to an exposed end thereof for receiving a wire extending lengthwise of said slit, said slit having a width less than the diameter of the wire and a circular recess at the bottom thereof equal in diameter to the wire to receive the wire whereby the wire may be forcibly moved along the slit to the recess by spreading the wire mount to increase the width of the slit and is held in the recess by the slit returning to its normal width.

DESCRIPTION OF THE PREFERRED EMBODIMENT

Figure 1:
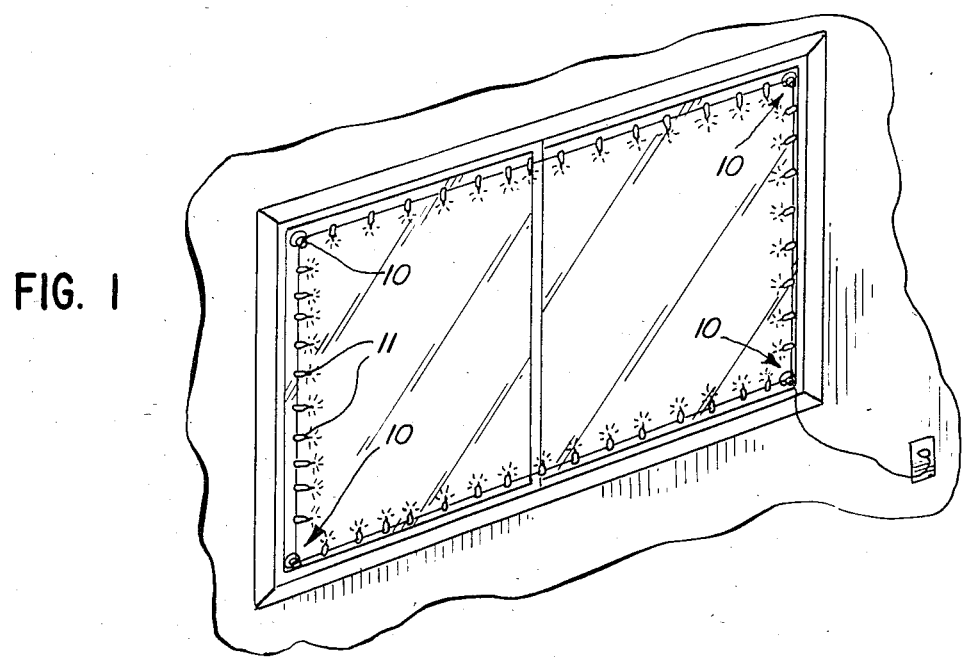
FIG. 1 is a perspective view of a window having a decorative Christmas light arrangement mounted thereon.
Figure 2:
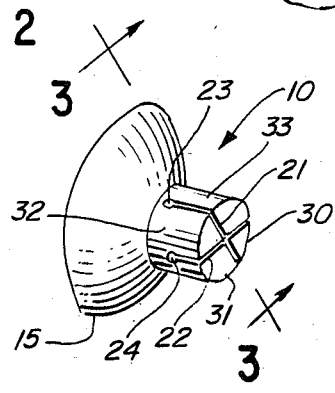
FIG. 2 is a perspective view of the onepiece wire holder.
Figure 3:
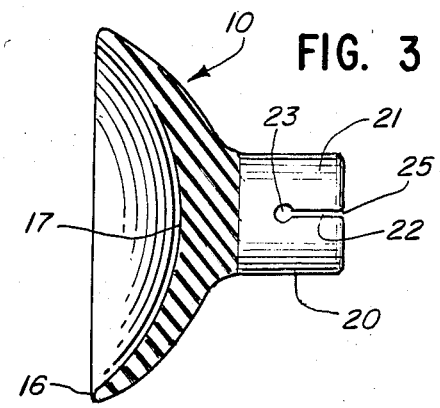
FIG. 3 is a sectional view, on an enlarged scale taken generally along the line 3—3 in FIG. 2.

The wire holder embodying the invention is indicated generally at 10 in FIGS. 2 and 3 and has particular utility for mounting wires to a slippery, nonporous surface, such as window glass. Such a use is shown in FIG. 1 wherein four of the wire holders 10 are mounted, one at each corner of the window, to each hold a length of electric wire forming part of a string of Christmas lights, having the individual lights 11. It will be evident that there is an endless variety of light arrangements which can be achieved by use of a desired number of the wire holders and the desired positioning thereof on the window glass.

The wire holder 10 has a first part 15 defining an attaching base and which is in the form of a suction cup being of a generally concavo-convex shape, having a full circle rim 16 and a concave interior wall 17. The attaching base is formed of a moldable plastic or rubber that has limited flexibility to achieve the action of a suction cup resulting from an applied pressure which forces air out from the concavity thereof to cause retention of the wire holder in place by a negative pressure. Additionally, the material of the wire holder has sufficient rigidity to enable retention of a wire by the structure of the second part of the wire holder that is to be described.

The wire holder has a second part 20 in the form of a cylindrical stem defining a wire mount and also a manually engageable member for installing and removing the wire holder. The cylindrical stem 20 is integral with the first part 15 and formed of the same moldable material having flexible and resilient properties. The cylindrical stem is formed with a pair of transversely-extending slits 21 and 22 which open to an outer end of the stem and which terminate in a generally circular recess 23 and 24, respectively. The slits form four flexible legs 30, 31, 32, 33 whereby a wire having a diameter greater than the width of a slit can be pushed inwardly to one of the generally circular recesses which is of a diameter approximating that of the wire. The wire insertion forces the legs apart and the wire is retained in the circular recess by the legs returning to their normal position. The width of the slits 21 and 22 is shown somewhat exaggerated in FIGS. 2 and 3 for clarity. The slits have their outer open ends of increased width to facilitate entry of a length of wire. This increased width is achieved by a slight taper on the legs adjacent the outer ends of the slits as shown at 25.

The circular recesses 23 and 24 are at different depths to permit holding a wire in both recesses.

Although the wire mount is shown with a pair of transverse slits, it will be appreciated that a single slit could be used. The use of the two transverse slits increases potential uses of the wire holder.

Figure 4:
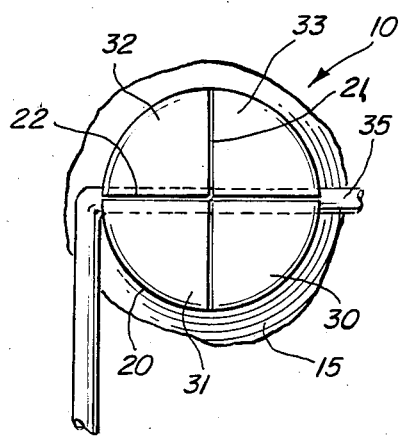
FIG. 4 is a fragmentary plan view of the wire holder operatively holding a single length of wire.
Figure 5:
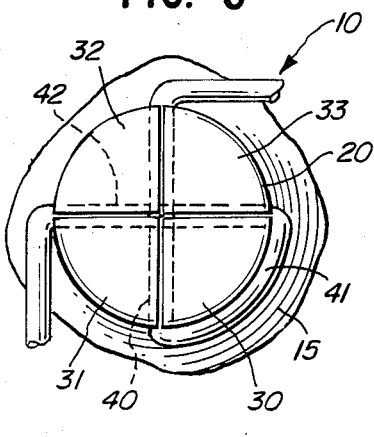
FIG. 5 is a view similar to FIG. 4 showing an alternative mode of holding a single wire.
Figure 6:
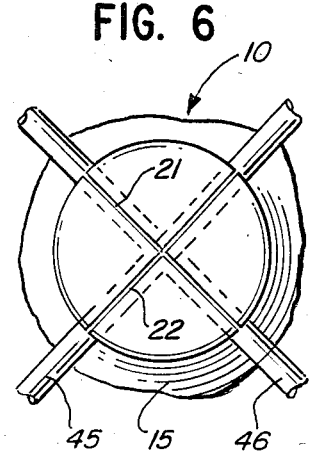
FIG. 6 is a view similar to FIG. 4 showing the wire holder holding two distinct lengths of wire.

A variety of uses is illustrated in FIGS. 4, 5 and 6.

In FIG. 4, the wire holder is shown with a length of wire 35 positioned in the generally circular recess 24 at the base of the slit 22 and retained therein by the legs having closed over the length of wire 35 after it has been forcibly advanced into the recess 24.

In FIG. 5, a more secure holding of a length of wire is achieved by use of both of the transverse slits 21 and 22. A first length 40 of the wire is advanced through the slit 21 to the deeper circular recess 23 and an exposed length of wire 41 then wraps around the exterior of the cylindrical stem and a wire length 42 is forcibly inserted in the slit 22 and advanced to the recess 24. The same wire has two lengths held in the two different recesses and a part of the wire wrapped about the exterior of the cylindrical stem 20.

FIG. 6 illustrates the use of the wire holder wherein two different wire lengths 45 and 46 can be mounted to the wire holder, with the first of the wire lengths being advanced through the slit 21 to the deeper recess 23 and the second wire length being then advanced through the slit 22 to the recess 24.

Referring back to FIG. 1, it will be seen that either of the wire mountings illustrated in FIGS. 4 and 5 could be used at a corner of the display shown in FIG. 1. When the desired display involves the crossing of two different wire lengths at some location, a wire holder can be mounted at that location and the wires secured thereto in the manner illustrated in FIG. 6.

The use of the wire holder is believed to be readily apparent from the foregoing description. A selected number of wire holders can be mounted at the desired locations on a window glass by holding a wire holder at the stem 20 and firmly pressing the attaching base to the window glass and, after the desired location of the holders has been achieved, the wire can be mounted thereto. In removal of the display, it is only necessary to forcibly release the wire holders from the window and they can be stored for future use.

We claim:

1. A wire holder for supporting one or more wires on the glass of a window to enable achievement of a desired lighting effect of Christmas lights by the use of a plurality of wire holders comprising, an attaching base of molded flexible material having a suction cup shape for holding to the glass by differential pressure and a wire mount of the same material and integral with said attaching base, said wire mount being generally cylindrical and having two pairs of flexible legs defining a pair of slits extending transversely to each other and opening to an exposed end of the wire mount for each receiving a length of wire extending lengthwise of one of said slits, said slits each having a width less than the diameter of the wire lengths and a circular recess at the bottom thereof equal in diameter to the wire lengths to receive a wire length whereby the wire lengths may be forcibly moved along the slits to the recesses by spreading the pairs of flexible legs to increase the width of the slits and the wire lengths are held in the recesses by the flexible legs returning to their normal position and the slits returning to their normal widths, said slits being of differing heights to have the circular recesses at differing heights and spaced apart a distance greater than the diameter of the wire to be held whereby one length of wire positioned in a circular recess can overlie another length of wire positioned in the other of said circular recesses, and said flexible legs having a slight taper at their exposed ends to facilitate entry of the wire lengths into said slits.

* * * * *